United States Patent
Ho (10) Patent No.: US 7,903,743 B2
(45) Date of Patent: Mar. 8, 2011

(54) MEMORY SHARING IN VIDEO TRANSCODING AND DISPLAYING

(75) Inventor: Cheng-Tsai Ho, Taichung (TW)

(73) Assignee: MediaTek Inc. (TW)

( * ) Notice: Subject to any disclaimer, the term of this patent is extended or adjusted under 35 U.S.C. 154(b) by 1411 days.

(21) Appl. No.: 11/363,891

(22) Filed: Feb. 27, 2006

(65) Prior Publication Data

US 2007/0092004 A1     Apr. 26, 2007

Related U.S. Application Data (60) Provisional application No. 60/596,851, filed on Oct. 26, 2005.

(51) Int. Cl.
*H04N 11/04* (2006.01)

(52) U.S. Cl. .................................. 375/240.25

(58) Field of Classification Search ............. 375/240.25, 375/240.26, 240.13
See application file for complete search history.

(56) References Cited

U.S. PATENT DOCUMENTS

| | | |
|---|---|---|
| 6,141,447 A | 10/2000 | Linzer et al. |
| 7,433,411 B2 * | 10/2008 | Nakamura et al. ........ 375/240.25 |
| 2001/0053276 A1 * | 12/2001 | Boyce ........................... 386/68 |
| 2002/0181588 A1 | 12/2002 | Okada |
| 2002/0196858 A1 | 12/2002 | Okada |
| 2003/0099293 A1 * | 5/2003 | Okada et al. ............ 375/240.13 |

FOREIGN PATENT DOCUMENTS

| | | |
|---|---|---|
| CN | 1435052 A | 6/2003 |
| CN | 1390046 A | 8/2003 |

OTHER PUBLICATIONS

Taiwanese Office Action date-stamped Apr. 27, 1999; Taiwanese Patent Application No. 09920268170; Taiwan Intellectual Property Office; Taiwan, R.O.C.

Taiwanese Office Action; Apr. 23, 2010; Taiwanese Patent Application No. 09920268170; Taiwan Intellectual Property Office; Taiwan, R.O.C.

* cited by examiner

*Primary Examiner* — Khai Tran
(74) *Attorney, Agent, or Firm* — The Law Offices of Andrew D. Fortney; Andrew D. Fortney

(57) ABSTRACT

A video processing apparatus includes a video decoder and a video encoder to process video frames. The video decoder generates decompressed frames from first compressed video frames and write the decompressed frames to a memory, at least one of the decompressed frames being generated using information from a previously generated decompressed frame. The video encoder generates second compressed video frames from the decompressed frames without duplicating the decompressed frames.

38 Claims, 6 Drawing Sheets

FIG. 5B

MEMORY SHARING IN VIDEO TRANSCODING AND DISPLAYING

CROSS-REFERENCE TO RELATED APPLICATIONS

This application claims priority to U.S. provisional patent application Ser. No. 60/596,851, filed on Oct. 26, 2005, titled "Video codec and display system using shared memory space," the contents of which are incorporated by reference.

BACKGROUND

This description relates to memory sharing in video transcoding and displaying.

A video transcoder is useful in decoding an encoded video (e.g., compressed video) and subsequently encoding the decoded video according to a different encoding scheme. A video includes a sequence of frames (also referred to as pictures), each frame including rows and columns of pixels. The transcoder may receive a first compressed video and generate a second compressed video, in which the second compressed video, for example, has a higher compression ratio and/or a lower resolution as compared to the first compressed video.

In some examples, the first and second compressed videos have the same resolution (i.e., each frame in the first compressed video has the same number of columns and rows as each frame in the second compressed video) but have different bit rates (e.g., the first compressed video may have a bit rate of 150 to 300 kbps, whereas the second compressed video may have a bit rate of 30 to 150 kbps). For video that is compressed according to an MPEG standard, changing a quantization level can change the bit rate of the video without changing the resolution. Increasing the quantization level will cause more bits to be truncated during the encoding process, resulting in a compressed video having a lower bit rate and a lower image quality.

In some examples, the first and second compressed videos having different resolutions. For example, the first compressed video can be a high definition television (HDTV) program having 1920×1080 resolution. If the user has a television with 1366×768 resolution, when he records the HDTV program for future viewing, it is useful to transcode the compressed 1920×1080 video to a compressed 1366×768 video to match the resolution of his television. By increasing the compression ratio and/or decreasing the resolution of a video, the user can reduce the bit rate of the compressed video so that more video programs can be stored in a given amount of storage.

For some compression algorithms, such as MPEG-2 or MPEG-4, the order in which frames are displayed is different from the order in which the frames are encoded/decoded. The MPEG standard defines intra (I), unidirectional (P), and bi-directional (B) frames, in which the I frames are compressed without reference to the other frames, the P frames are compressed/decompressed using information from a previous I frame or P frame, and the B frames are compressed/decompressed using information from a previous I or P frame and a subsequent I or P frame. For example, the frames may be displayed according to a "display order": I0, B1, B2, P3, B4, B5, P6, B7, B8, P9, B10, B11, etc., in which the frame I0 is an I-frame that is displayed during time interval T0, the frame B1 is a B-frame that is displayed during time interval T1, and so forth. On the other hand, the frames may be encoded/decoded according to an "encode order": I0, P3, B1, B2, P6, B4, B5, P9, B7, B8, P12, B10, B11, etc., indicating that the frame P3 is encoded/decoded before the frames B1 and B2, even though the frames B1 and B2 are displayed before the frame P3. Because the encoding/decoding sequence is different from the display sequence, when a compressed video is transcoded so that it can be viewed on a display and recorded in a storage medium, several memory buffers are used to temporarily store frames during the decoding, displaying, and encoding processes.

SUMMARY

In general, in one aspect, an apparatus includes a video decoder to generate decompressed frames from first compressed video frames and write the decompressed frames to a memory, at least one of the decompressed frames being generated using information from a previously generated decompressed frame, and a video encoder to generate second compressed video frames from the decompressed frames without duplicating the decompressed frames.

Implementations may include one or more of the following features. The apparatus includes a display controller to control display of the decompressed frames without duplicating the decompressed frames. The apparatus includes a system controller to control the video decoder, the video encoder, and display controller to generate and display the second compressed video frames before the decompressed frames stored in the memory are overwritten by subsequent decompressed frames. The video encoder generates reconstructed frames that correspond to frames decompressed from the second compressed video, the video encoder storing the reconstructed frames in the memory. The apparatus includes a display controller to cause display of the reconstructed frames without duplicating the reconstructed frames. The apparatus includes a system controller to control the video decoder and the video encoder to generate the second compressed video frames before the decompressed frames stored in the memory are overwritten by subsequent decompressed frames. The decompressed frames include intra-frames (I-frames), forward predicted frames (P-frames), and bi-directional predicted frames (B-frames). When the decompressed frames are arranged in a display sequence, the decompressed frames include at least two consecutive B-frames. The video decoder and video encoder share the memory such that the memory at any given time stores no more than four decompressed frames written by the video decoder and two reconstructed frames written by the video encoder. In some examples, the video decoder and the video encoder share the memory such that the memory at any given time stores no more than six decompressed frames. In some examples, the video decoder and the video encoder share the memory such that the memory at any given time stores at most seven decompressed frames. The first compressed video and the second compressed video have different bit rates. The first compressed video and the second compressed video have different resolutions. The apparatus includes a descaler to generate lower resolution frames from higher resolution frames. The first compressed video includes a serial bit stream.

In general, in another aspect, a video processing system includes a memory, a video decoder, a video encoder, a display controller, and a system controller. The video decoder generates decompressed frames that include intra-frames (I-frames), forward predicted frames (P-frames), and bi-directional predicted frames (B-frames) from first compressed video, the video decoder writing the decompressed frames to the memory, at least some of the decompressed frames being generated using information from previously decompressed frames. The video encoder generates second compressed video frames from the decompressed frames without duplicating the decompressed frames, the second compressed video frames having a different bit rate and/or different resolution as compared to the first compressed video frames. The display controller outputs a representation of the first compressed video frames to a display device without duplicating the frames stored in the memory. The system controller controls the video decoder, the video encoder, and the display controller.

In general, in another aspect, an apparatus includes a decoding means for generating decoded frames from first encoded video frames using information from previously decoded frames, the decoding means writing the decoded frames to a memory, and an encoding means for generating second encoded video frames from the decoded frames without duplicating the decoded frames.

Implementations may include one or more of the following features. The apparatus includes a display means for displaying representation of the decoded frames without duplicating frames stored in the memory. The decoded frames include intra-frames (I-frames), forward predicted frames (P-frames), and bidirectional predicted frames (B-frames).

In general, in another aspect, an apparatus includes a video decoder to generate decompressed frames from first compressed video frames and write the decompressed frames to a memory, the first compressed video includes a sequence of compressed frames that are arranged according to a display sequence, and a video encoder to generate second compressed video frames from the decompressed frames without duplicating the decompressed frames.

Implementations may include one or more of the following features. The apparatus includes a display controller to cause display of a representation of the decompressed frames without duplicating the decompressed frames. The decompressed frames include intra-frames (I-frames), forward predicted frames (P-frames), and bi-directional predicted frames (B-frames).

In general, in another aspect, a method includes generating decompressed frames of a first compressed video using information from previously decompressed frames, writing the decompressed frames to a memory, and generating a second compressed video using the decompressed frames stored in the memory without duplicating the decompressed frames.

Implementations may include one or more of the following features. The method includes controlling the generating of the decompressed frames and the generating of the second compressed video so that the decompressed frames are compressed before being overwritten by subsequent decompressed frames. The method includes displaying the decompressed frames without duplicating the decompressed frames. The method includes controlling the generating of the decompressed frames, the generating of the second compressed video, and the displaying so that the decompressed frames are compressed and displayed before being overwritten by subsequent decompressed frames. Generating the decompressed frames includes generating intra-frames (I-frames), forward predicted frames (P-frames), and bi-directional predicted frames (B-frames). When the decompressed frames are arranged in a display sequence, the sequence includes two consecutive B-frames. The writing and the encoding includes storing at most 6 decompressed frames in the memory. The writing and the encoding includes storing at most seven decompressed frames in the memory.

In general, in another aspect, a method includes generating decompressed frames from a first compressed video includes a sequence of compressed frames that are arranged according to a display sequence, writing the decompressed frames to a memory, and generating a second compressed video from the decompressed frames without duplicating the decompressed frames.

In general, in another aspect, a method includes decoding a first compressed video to generate decompressed frames, writing the decompressed frames to a memory, encoding the decompressed frames to generate a second compressed video, including generating reconstructed frames for use as references for encoding some of the decompressed frames, and writing the reconstructed frames in the memory, at least some of the reconstructed frames overwriting some of the decompressed frames.

Implementations may include one or more of the following features. The second compressed video has a data rate that is different from the data rate of the first compressed video. The second compressed video has a resolution that is different from the resolution of the first compressed video. The method includes displaying the reconstructed frames without duplicating the reconstructed frames. The decoding includes decoding according to an MPEG standard.

Among the advantages are one or more of the following: A smaller memory can be used for transcoding and displaying. As an example, video on a standard DVD (Digital Versatile Disc, which has a resolution of 720×480) may have a bit rate of about 150 kbits to 300 kbits per frame and video on a standard VCD (Video CD) may have a bit rate of about 30 kbits to 150 kbits per frame. When transcoding video on a DVD to video for a VCD, decompressed frames having a bit rate of about 4153.3 kbits per frame are temporarily stored in the memory. Using the techniques described here, the memory does not need to store more than six (or seven, depending on the application) decompressed frames at the same time. When processing an HDTV program having 1920×1080 resolution, using 12 bits to represent each pixel, each decompressed frame has about 24.9 Mbits. Thus, reducing the number of frames that need to be simultaneously stored in the memory during the decoding, encoding, and displaying processes can result in significant reduction in memory usage and cost.

DESCRIPTION

Figure 1:
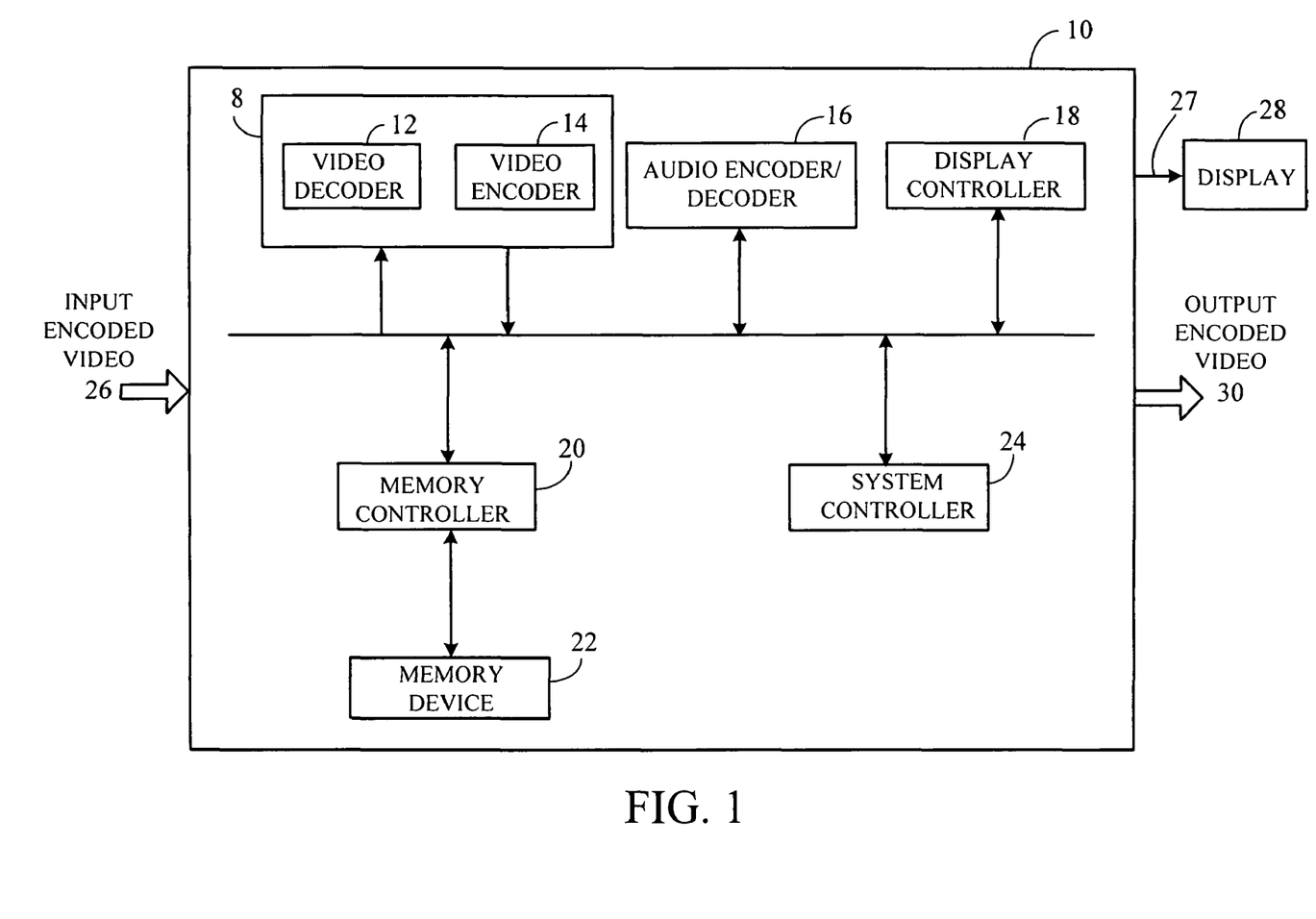
FIG. 1 is a schematic block diagram of a video controller.

Referring to FIG. 1, a video controller 10 includes a video codec 8, a display controller 18, and a memory device 22. The video codec 8 includes a video decoder 12 and a video encoder 14. The video controller 10 receives an input encoded video 26 and generates an output encoded video 30. The videos 26 and 30 can be sent as, for example, serial bit streams. The input and output encoded videos 26 and 30 may have frames that are encoded differently, such as according to different compression algorithms having different compression ratios or different resolutions. The display controller 18 generates a video signal 27 for a display 28. Each of the videos 26 and 30 includes a sequence of frames. During decoding, encoding, and displaying of the frames, certain frames are temporarily stored in the memory device 22. The video decoder 12, video encoder 14, and the display controller 18 share the memory device 22 so that the number of frames that need to be simultaneously stored in the memory device 22 is fewer than for other systems. Thus, a smaller memory device 22 suffices.

The video decoder 12, video encoder 14, and display controller 18 process the frames in a particular sequence such that the frames do not need to be duplicated or moved from one memory location to another during decoding, encoding, and displaying, thereby reducing the number of frames that need to be simultaneously stored in the memory. The particular processing sequence takes into account the format of the input encoded video 26 (e.g., whether the frames in the video 26 are in a display order or an encode order), the dependencies among the frames (e.g., B and P frames may depend on previous P and I frames), whether the frames are displayed at the same time that the frames are being encoded, and the type of frames to be displayed (e.g., decompressed or reconstructed frames).

The video controller 10 also includes an audio encoder/decoder 16 that decodes and encodes audio signals, a memory controller 20 to control access to the memory device 22, and a system controller 24 that coordinates operations of the video decoder 12, video encoder 14, audio encoder/decoder 16, display controller 18, and the memory controller 20. The video controller 10 can be fabricated on a single integrated circuit or may include several integrated circuits and discrete components.

The following describes six examples of using the video controller 10 to transcode (or encode) and display videos.

Example 1

Figure 2A:
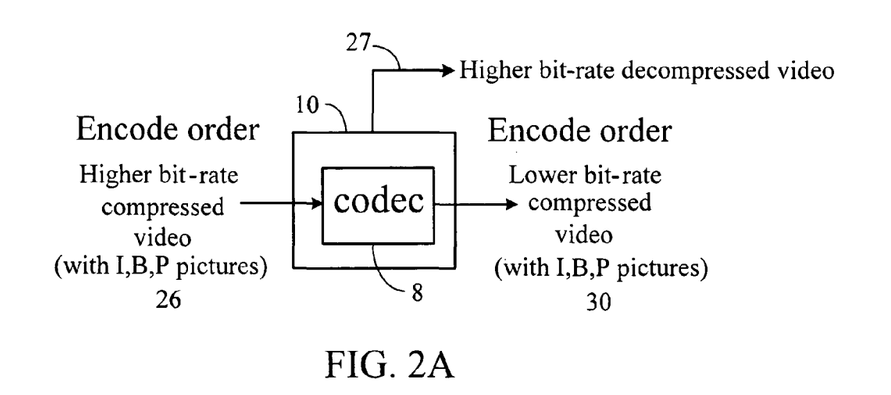
FIGS. 2A, 3A, 4A, and 5A are diagrams of input/output signals.

Referring to FIG. 2A, in example 1, the input encoded video 26 is a higher bit-rate compressed video, and the output encoded video 30 is a lower bit-rate compressed video. The encoded videos 26 and 30 have the same resolution. Both videos 26 and 30 have frames that are arranged in an encode order. The display controller 18 sends higher bit-rate decompressed frames arranged in the display order to the display 28. The video controller 10 outputs a lower bit-rate compressed video 30 (e.g., for storage) at the same time that the display 28 shows a higher bit-rate decompressed video. The frames of the videos 26 and 30 can be encoded, for example, according to an MPEG standard.

In this description, a "higher bit-rate compressed video" has a higher bit rate relative to a "lower bit-rate compressed video," and a "higher bit-rate decompressed video" has a higher bit rate relative to a "lower bit-rate decompressed video." The "higher bit-rate compressed video," due to compression, can have a bit rate that is lower than the "lower bit-rate decompressed video." The resolution of a compressed video refers to the resolution of the decompressed frames. A "higher resolution compressed video" can be decompressed to generate decompressed frames that have a higher resolution relative to decompressed frames derived from a "lower resolution compressed video."

Figure 2B:
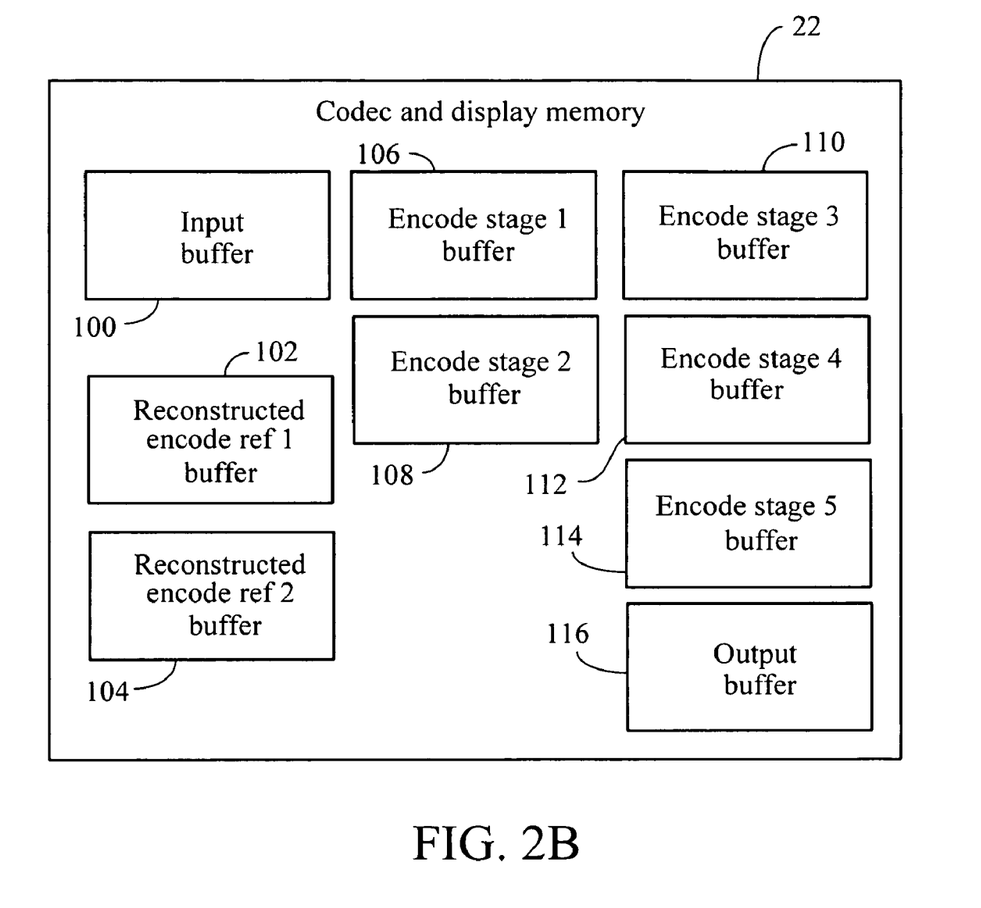
FIG. 2B is a block diagram of a memory device.

FIG. 2B shows memory buffers that are allocated in the memory device 22 for storing frames that are generated during the decoding, encoding, and displaying processes. The memory device 22 includes an input buffer 100, a reconstructed encode reference 1 buffer 102, a reconstructed encode reference 2 buffer 104, an encode stage 1 buffer 106, an encode stage 2 buffer 108, an encode stage 3 buffer 110, an encode stage 4 buffer 112, an encode stage 5 buffer 114, and an output buffer 116.

The input buffer 100 stores a higher bit-rate compressed frame, and the output buffer 116 stores a lower bit-rate compressed frame (e.g., for delivery to a storage device). The encode stage 1 buffer 106, encode stage 2 buffer 108, encode stage 3 buffer 110, encode stage 4 buffer 112, and encode stage 5 buffer 114 store higher bit-rate decompressed frames that are output from the video decoder 12. The reconstructed encode reference 1 buffer 102 and the reconstructed encode reference 2 buffer 104 store lower bit-rate reconstructed frames that are generated by the video encoder 14, and are used by the video encoder 14 during encoding of other frames. The video encoder may generate the lower bit rate decompressed frames by, for example, increasing a quantization level (truncating more bits) during encoding of the frames.

The lower bit-rate reconstructed frames in buffers 102, 104 are decompressed frames. In this example, the reconstructed frames have the same resolution as the higher bit-rate decompressed frames.

Figure 2C:
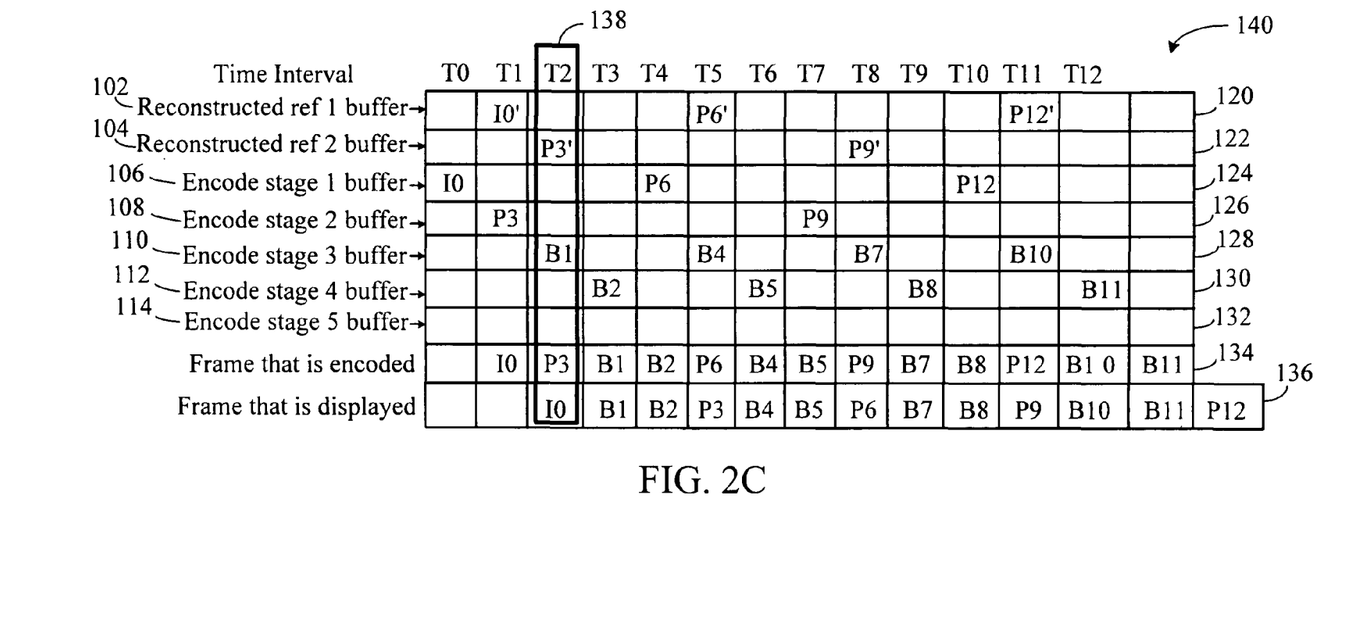
FIGS. 2C, 3B, 4B, and 5B are timing charts.

FIG. 2C shows a time chart 140 indicating timing sequences in which the frames are stored in the buffers of the memory device 22 and shown on the display 28. The frames are displayed in the order: I0, B1, B2, P3, B4, B5, P6, B7, B8, P9, B10, B11, P12, and so forth. Rows 120, 122, 124, 126, 128, 130, to 132 indicate the contents of the buffers 102, 104, 106, 108, 110, 112, and 114, respectively. Row 134 indicates the time intervals at which the frames are encoded. Row 136 indicates the time intervals at which the frames are fetched by the display controller 18 and shown on the display 28.

In this example, the encode stage 5 buffer 114 is not used. The memory device 22 has a large enough capacity to accommodate the encode stage 5 buffer 114 for use in other examples (e.g., examples 5 and 6 described below).

Each column (e.g., 138) in the time chart 140 indicates the contents of the buffers, the frame that is encoded by the video encoder 14, and the frame that is shown on the display 28 during a particular time interval T. As can be seen from the time chart 140, each frame is accessed by only one of the video decoder 12, the video encoder 14, and the display controller 18 at any given time interval, so the video decoder 12, the video encoder 14, and the display controller 18 can share the frames stored in the memory buffers without conflict. Each frame in the memory device 22 is stored once without duplication.

The following describes the processes performed by the video decoder 12, the video encoder 14, and the display controller 18 at various time intervals. Each time interval, such as T0, T1, T2, . . . , represents a frame period, which can be about 33.3 ms when the video is configured to have 30 frames per second.

Before time interval T0 (not shown in FIG. 2C), a higher bit-rate compressed I0 frame is written to the input buffer 100. Similarly, during time intervals T0, T1, T2, T3, T4, T5, T6, T7, T8, T9, T10, T11, T12, . . . , higher-bit-rate compressed frames P3, B1, B2, P6, B4, B5, P9, B7, B8, P12, B10, B11, . . . , respectively, are written to the input buffer 100.

During time interval T0, the video decoder 12 retrieves the compressed I0 frame from the input buffer 100, decodes the compressed I0 frame to generate a higher bit-rate decompressed frame I0, and writes the decompressed I0 frame to the encode stage 1 buffer 106.

During time interval T1, the video decoder 12 retrieves the compressed P3 frame from the input buffer 100, decodes the compressed P3 frame and generates a decompressed P3 frame, and writes the decompressed P3 frame to the encode stage 2 buffer 108. The video encoder 14 retrieves the higher bit-rate decompressed I0 frame from the buffer 106, encodes the I0 frame to generate a lower bit-rate reconstructed I0' frame and a lower bit-rate compressed I0' frame, writes the reconstructed I0' frame to the reconstructed reference 1 buffer 102, and writes the compressed I0' frame to the output buffer 116.

During time interval T2, the video decoder 12 decodes the higher bit-rate compressed B1 frame to generate a higher bit-rate decompressed B1 frame, and writes the decompressed B1 frame to the encode stage 3 buffer 110. The video encoder 14 retrieves the decompressed P3 frame from the buffer 108, encodes the decompressed P3 frame to generate a lower bit-rate reconstructed P3' frame and a lower resolution compressed P3' frame, writes the reconstructed P3' frame to the reconstructed reference 2 buffer 104, and writes the compressed P3' frame to the output buffer 116. The display controller 18 retrieves the higher bit-rate decompressed I0 frame from the buffer 106 and causes the I0 frame to be shown on the display 28.

During time interval T3, the video decoder 12 decodes the higher bit-rate compressed B2 frame to generate a higher bit-rate decompressed B2 frame, and writes the decompressed B2 frame to the encode stage 4 buffer 112. The video encoder 14 retrieves the decompressed B1 frame from the buffer 110, encodes the decompressed B1 frame to generate a lower bit-rate compressed B1' frame, and writes the compressed B1' frame to the output buffer 116. The display controller 18 retrieves the higher bit-rate decompressed B1 frame from the buffer 110 and causes the B1 frame to be shown on the display 28.

During time interval T4, the video decoder 12 decodes the higher bit-rate compressed P6 frame to generate a higher bit-rate decompressed P6 frame, and writes the decompressed P6 frame to the encode stage 1 buffer 106. The video encoder 14 retrieves the decompressed B2 frame from the buffer 112, encodes the decompressed B2 frame to generate a lower bit-rate compressed B2' frame, and writes the compressed B2' frame to the output buffer 116. The display controller 18 retrieves the higher bit-rate decompressed B2 frame from the buffer 112 and causes the B2 frame to be shown on the display 28.

During time interval T5, the video decoder 12 decodes a higher bit-rate compressed B4 frame to generate a higher bit-rate decompressed B4 frame, and writes the decompressed B4 frame to the encode stage 3 buffer 110. The video encoder 14 retrieves the decompressed P6 frame from the buffer 106, encodes the decompressed P6 frame to generate a lower bit-rate reconstructed P6' frame and a lower bit-rate compressed P6' frame, writes the reconstructed P6' frame to the buffer 102, and writes compressed P6' frame to the output buffer 116. The display controller 18 retrieves the higher bit-rate decompressed P3 frame from the buffer 108 and causes the P3 frame to be shown on the display 28.

During time interval T6, the video decoder 12 decodes the higher bit-rate compressed B5 frame to generate a higher bit-rate decompressed B5 frame, and writes the decompressed B5 frame to the encode stage 4 buffer 112. The video encoder 14 retrieves the decompressed B4 frame from the buffer 110, encodes the decompressed B4 frame to generate a lower bit-rate compressed B4' frame, and writes the compressed B4' frame to the output buffer 116. The display controller 18 retrieves the higher bit-rate decompressed B4 frame from the buffer 110 and causes the B4 frame to be shown on the display 28.

During time interval T7, the video decoder 12 decodes the higher bit-rate compressed P9 frame to generate a higher bit-rate decompressed P9 frame, and writes the decompressed P9 frame to the encode stage 2 buffer 108. The video encoder 14 retrieves the decompressed B5 frame from the buffer 112, encodes the decompressed B5 frame to generate a lower bit-rate compressed B5' frame, and writes the compressed B5' frame to the output buffer 116. The display controller 18 retrieves the higher bit-rate decompressed B5 frame from the buffer 112 and causes the B5 frame to be shown on the display 28.

During time intervals T8, T9, T10, and so forth, the video controller 10 operates in a manner similar to those described above.

The operation of the video decoder 12, the video encoder 14, and the display controller 18 is designed such that a first frame is overwritten by a second frame only after the first frame will no longer be used by the video decoder 12, the video encoder 14, or the display controller 18. For example, during and after the time interval T4, the I0 frame is not used by the video decoder 12, the video encoder 14, or the display controller 18, so the I0 frame in the encode stage 1 buffer 106 can be overwritten by the P6 frame during T4. Similarly, during and after the time interval T7, the P3 frame in the encode stage 2 buffer 108 is not used by the video decoder 12, the video encoder 14, or the display controller 18, so the P3 frame can be overwritten by the P9 frame during T7.

Because the B-frames are not referenced by any other frame, it is not necessary to store lower bit-rate reconstructed B'-frames in the memory device 22.

In example 1, the video decoder 12, the video encoder 14, and the display controller 18 share the memory 22 such that the memory 22 at any given time stores no more than four decompressed frames (in buffers 106, 108, 110, and 112) written by the video decoder 12 and two reconstructed frames (in buffers 102 and 104) written by the video encoder 14. Because the reconstructed frames are decompressed frames, the memory 22 at any given time stores no more than six decompressed frames.

The operations of the video decoder 12, the video encoder 14, and the display controller 18 are coordinated by the system controller 24. For example, the system controller 24 may adjust pointers used by the video decoder 12, the video encoder 14, and the display controller 18 to control which memory buffer is accessed by the video decoder 12, the video encoder 14, and the display controller 18.

Example 2

In example 2, the lower bit-rate compressed video 30 has a lower resolution as compared to the higher bit-rate compressed video 26. The compressed videos 26 and 30 may have the same or different compression ratios (e.g., quantization levels). For example, the input encoded video 26 can have 1920×1080 resolution, and the output encoded video 30 can have 1366×768 resolution. Both the encoded videos 26 and 30 have frames that are arranged in an encode order. The display controller 18 sends higher resolution frames arranged in the display order to the display 28. Thus, the video controller 10 outputs a lower bit-rate compressed video 30 having a lower resolution at the same time that the display 28 shows the video in a higher resolution.

The allocation of memory buffers in the memory device 22 for example 2 is similar to that of example 1, as shown in FIG. 2B. The input buffer 100 stores a higher resolution compressed frame, and the output buffer 116 stores a lower resolution compressed frame generated by the video encoder 14. The encode stage 1 buffer 106, encode stage 2 buffer 108, encode stage 3 buffer 110, encode stage 4 buffer 112, and encode stage 5 buffer 114 store higher resolution decompressed frames that are output from the video decoder 12. The reconstructed encode reference 1 buffer 102 and the reconstructed encode reference 2 buffer 104 store lower resolution reconstructed frames that are used by the video encoder 14 during the encoding process to generate the lower resolution compressed frames. A descaler can generate the lower resolution reconstructed frames by using a descaling process. The descaler can be part of the video decoder 12 or the video encoder 14. The descaler can also be a component independent of the video decoder 12 and the video encoder 14. The encoding and the descaling of the frames can be performed at the same time.

Timing sequences for example 2 is similar to that of example 1, as shown in FIG. 2C. The processes performed by the video decoder 12, the video encoder 14, and the display controller 18 are similar to those described in example 1, except that the frames I0', B1', B2', P3', B4', B5', P6', B7', B8', P9', B10', B11', and P12' are lower resolution reconstructed frames, and I0, B1, B2, P3, B4, B5, P6, B7, B8, P9, B10, B11, and P12 are higher resolution decompressed frames.

Similar to example 1, in example 2, the video decoder 12, the video encoder 14, and the display controller share the memory 22 such that the memory 22 at any given time stores no more than six decompressed frames, including four decompressed frames written by the video decoder 12 and two reconstructed frames written by the video encoder 14.

Example 3

Figure 3A:
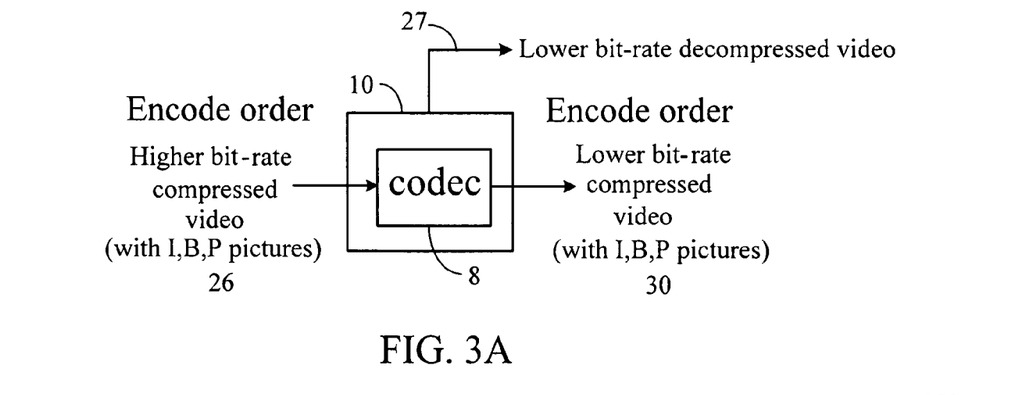

Referring to FIG. 3A, in example 3, similar to example 1, the input encoded video 26 is a higher bit-rate compressed video, and the output encoded video 30 is a lower bit-rate compressed video. The encoded videos 26 and 30 have the same resolution but different bit rates. Both the encoded videos 26 and 30 have frames that are arranged in an encode order. The frames of the videos 26 and 30 can be encoded, for example, according to an MPEG standard.

In example 3, the display controller 18 sends lower bit-rate frames arranged in the display order to the display 28. The video controller 10 outputs a lower bit-rate compressed video 30 at the same time that the display 28 shows a lower bit-rate decompressed video.

Figure 3B:
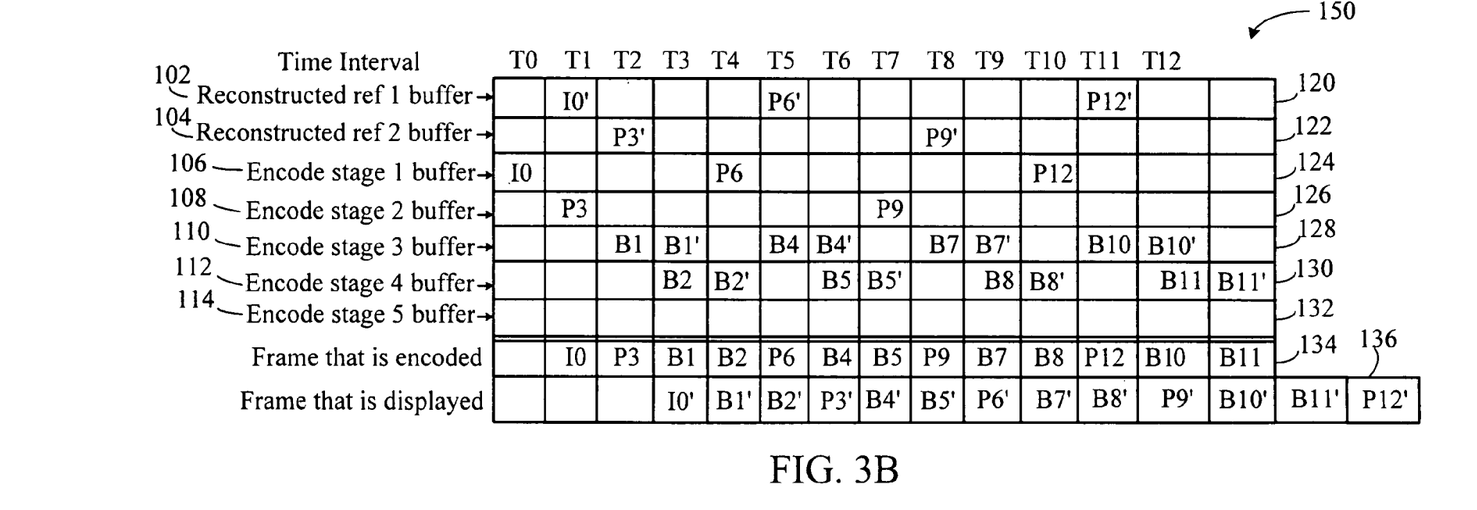

FIG. 3B shows a time chart 150 indicating timing sequences in which the frames are stored in the buffers of the memory device 22 and shown on the display 28. In this example, the encode stage 5 buffer 114 is not used.

As can be seen from the time chart 150, each frame is accessed by only one of the video decoder 12, the video encoder 14, and the display controller 18 at any given time interval, so that the video decoder 12, the video encoder 14, and the display controller 18 can share the frames stored in the memory buffers without conflict. Each frame in the memory device 22 is stored once without duplication.

The following describes the processes performed by the video decoder 12, the video encoder 14, and the display controller 18 at various time intervals.

Before time interval T0 (not shown in FIG. 3B), a higher bit-rate compressed I0 frame is written to the input buffer 100. Similarly, during time intervals T0, T1, T2, T3, T4, T5, T6, T7, T8, T9, T10, T11, T12, . . . , higher bit-rate compressed frames P3, B1, B2, P6, B4, B5, P9, B7, B8, P12, B10, B11, . . . , respectively, are written to the input buffer 100.

During time intervals T0 and T1, the video decoder 12 and the video encoder 14 operate in a manner similar to those in example 1, as shown in FIG. 2C.

During time interval T2, the video decoder 12 and the video encoder 14 operate in a manner similar to those in example 1, as shown in FIG. 2C. However, the display controller 18 does not cause any frame to be shown on the display 28 during T2.

During time interval T3, the video decoder 12 decodes the higher bit-rate compressed B2 frame to generate a higher bit-rate decompressed B2 frame, and writes the decompressed B2 frame to the encode stage 4 buffer 112. The video encoder 14 retrieves the decompressed B1 frame from the buffer 110, encodes the decompressed B1 frame to generate a lower bit-rate reconstructed B1' frame and a lower bit-rate compressed B1' frame, writes the reconstructed B1' frame to the buffer 110, and writes the compressed B1' frame to the output buffer 116. The display controller 18 retrieves the lower bit-rate reconstructed I0' frame from the buffer 102 and causes the I0' frame to be shown on the display 28.

The higher bit-rate decompressed frame B1 and the lower bit-rate reconstructed frame B1' have the same resolution (i.e., the same number of columns and rows), so the decompressed frame B1 and the reconstructed frame B1' have the same size (i.e., have the same number of bits). The decompressed frame B1 and the reconstructed frame B1' may have different image qualities. For example, the reconstructed B1' frame may not be as sharp as the decompressed B1 frame, and block artifacts in the reconstructed B1' frame may be more visible than in the decompressed B1 frame.

During time interval T4, the video decoder 12 decodes the higher bit-rate compressed P6 frame to generate a higher bit-rate decompressed P6 frame, and writes the decompressed P6 frame to the buffer 106. The video encoder 14 retrieves the decompressed B2 frame from the buffer 112, encodes the decompressed B2 frame to generate a lower bit-rate reconstructed B2' frame and a lower bit-rate compressed B2' frame, writes the reconstructed B2' frame to the buffer 112, and writes the compressed B2' frame to the output buffer 116. The display controller 18 retrieves the lower bit-rate reconstructed B1' frame from the buffer 110 and causes the B1' frame to be shown on the display 28.

During time interval T5, the video decoder 12 decodes a higher bit-rate compressed B4 frame to generate a higher bit-rate decompressed B4 frame, and writes the decompressed B4 frame to the encode stage 3 buffer 110. The video encoder 14 retrieves the decompressed P6 frame from the buffer 106, encodes the decompressed P6 frame to generate a lower bit-rate reconstructed P6' frame and a lower bit-rate compressed P6' frame, writes the reconstructed P6' frame to the buffer 102, and writes compressed P6' frame to the output buffer 116. The display controller 18 retrieves the lower bit-rate reconstructed B2' frame from the buffer 112 and causes the B2' frame to be shown on the display 28.

During time interval T6, the video decoder 12 decodes the higher bit-rate compressed B5 frame to generate a higher bit-rate decompressed B5 frame, and writes the decompressed B5 frame to the encode stage 4 buffer 112. The video encoder 14 retrieves the decompressed B4 frame from the buffer 110, encodes the decompressed B4 frame to generate a lower bit-rate reconstructed B4' frame and a lower bit-rate compressed B4' frame, writes the reconstructed B4' frame to the buffer 110, and writes the compressed B4' frame to the output buffer 116. The display controller 18 retrieves the lower bit-rate reconstructed P3' frame from the buffer 104 and causes the P3' frame to be shown on the display 28.

During time interval T7, the video decoder 12 decodes the higher bit-rate compressed P9 frame to generate a higher bit-rate decompressed P9 frame, and writes the decompressed P9 frame to the buffer 108. The video encoder 14 retrieves the decompressed B5 frame from the buffer 112, encodes the decompressed B5 frame to generate a lower bit-rate reconstructed B5' frame and a lower bit-rate compressed B5' frame, writes the reconstructed B5' frame to the buffer 112, and writes the compressed B5' frame to the output buffer 116. The display controller 18 retrieves the lower bit-rate reconstructed B4' frame from the buffer 110 and causes the B4' frame to be shown on the display 28.

During time intervals T8, T9, T10, and so forth, the video controller 10 operates in a manner similar to those described above.

In example 3, similar to example 1, the operations of the video decoder 12, video encoder 14, and display controller 18 are designed such that a first frame is overwritten by a second frame only after the first frame will not be used by the video decoder 12, the video encoder 14, or the display controller 18. The video decoder 12, the video encoder 14, and the display controller 18 share the memory 22 such that the memory 22 at any given time stores no more than six decompressed frames in buffers 102, 104, 106, 108, 110, and 112.

Example 4

In example 4, the lower bit-rate compressed video 30 has a lower resolution as compared to the higher bit-rate compressed video 26. The compressed videos 26 and 30 may have the same or different compression ratios (e.g., quantization levels). For example, the input encoded video 26 can have 1920×1080 resolution, and the output encoded video 30 can have 1366×768 resolution. Both the encoded videos 26 and 30 have frames that are arranged in an encode order. The display controller 18 sends lower resolution frames arranged in the display order to the display 28. Thus, the video controller 10 outputs a lower bit-rate compressed video 30 having a lower resolution at the same time that the display 28 shows the video in a lower resolution.

The allocation of memory buffers in the memory device 22 for example 4 is similar to that of example 2, as shown in FIG. 3B. The input buffer 100 stores a higher resolution compressed frame, and the output buffer 116 stores a lower resolution compressed frame generated by the video encoder 14. A descaler may generate the lower resolution decompressed frames by using a de-scaling process. The encoding and the de-scaling of the frames may be performed at the same time.

Timing sequences for example 4 is similar to those of example 3, as shown in FIG. 3B. The processes performed by the video decoder 12, the video encoder 14, and the display controller 18 are similar to those described in example 3, except that the frames I0', B1', B2', P3', B4', B5', P6', B7', B8', P9', B10', B11', and P12' are lower resolution reconstructed frames, and I0, B1, B2, P3, B4, B5, P6, B7, B8, P9, B10, B11, and P12 are higher resolution decompressed frames.

Similar to example 3, in example 4, the video decoder 12, the video encoder 14, and the display controller 18 share the memory 22 such that the memory 22 at any given time stores no more than six decompressed frames in buffers 102, 104, 106, 108, 110, and 112.

Example 5

Figure 4A:
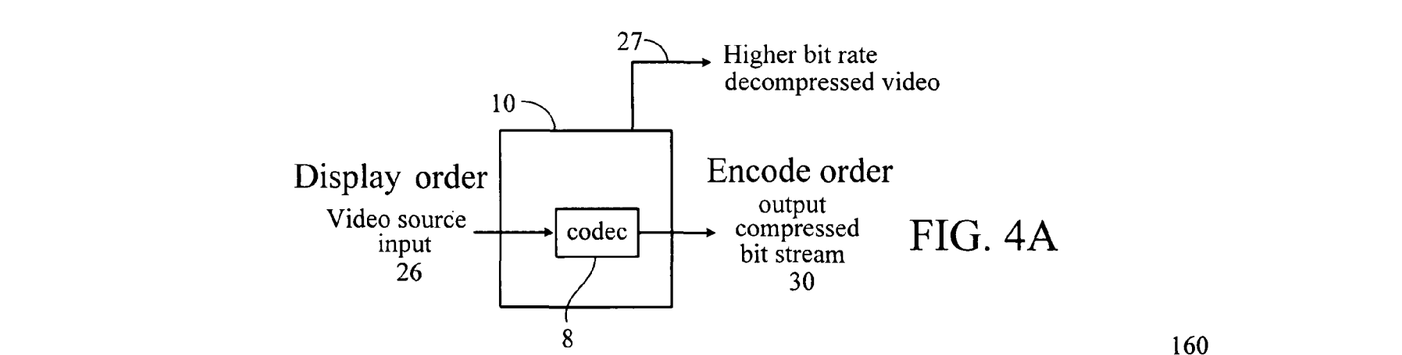

Referring to FIG. 4A, in example 5, the input encoded video 26 is a compressed higher bit-rate video from a video source, such as a high definition video camcorder. The frames in the input video 26 are arranged in the display order and are compressed according to, e.g., digital video (DV) or JPEG format, which specifies that the compressed frames are all intra frames. The output encoded video 30 is a compressed lower bit-rate video in which the frames are arranged in the encode order. The frames of the output video 30 are encoded according to, e.g., an MPEG standard. The input video 26 includes I frames arranged in the display order, and the output video 30 includes I, B, and P frames arranged in the encode order. The videos 26 and 30 have the same resolution but different bit rates. The display controller 18 sends higher bit-rate frames to the display 28 in the display order.

Figure 4B:
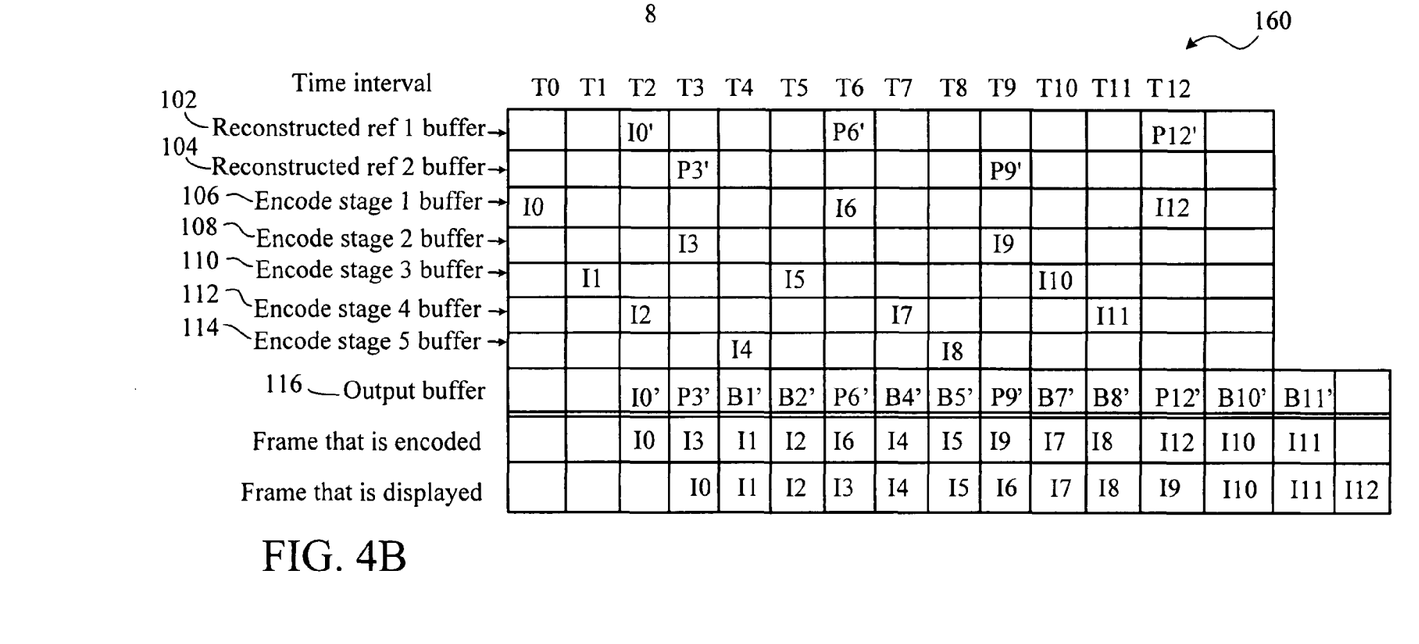

FIG. 4B shows a time chart 160 indicating timing sequences in which the frames are stored in the buffers of the memory device 22 and shown on the display 28. In this example, the encode stage 5 buffer 114 is used (as compared to examples 1-4 in which the buffer 114 is not used).

As can be seen from the time chart 160, each frame is accessed by only one of the video decoder 12, the video encoder 14, and the display controller 18 at any given time interval, so that the video decoder 12, the video encoder 14, and the display controller 18 can share the frames stored in the memory buffers without conflict. Each frame that is stored in the memory device 22 is stored once without duplication.

The following describes the processes performed by the video decoder 12, the video encoder 14, and display controller 18 at various time intervals.

Before time interval T0 (not shown in FIG. 4B), a higher bit-rate encoded I0 frame is written to the input buffer 100. Similarly, during time intervals T0, T1, T2, T3, T4, T5, T6, T7, T8, T9, T10, T11, T12, . . . , higher bit-rate encoded frames I1, I2, I3, I4, I5, I6, I7, I8, I9, I10, I11, . . . , respectively, are written to the input buffer 100.

During time interval T0, the video decoder 12 decodes the encoded I0 frame to generate a higher bit-rate decompressed I0 frame, and writes the decompressed I0 frame to the encode stage 1 buffer 106.

During time interval T1, the video decoder 12 decodes the encoded I1 frame and generates a higher bit-rate decompressed I1 frame, and writes the decompressed I1 frame to the encode stage 3 buffer 110.

During time interval T2, the video decoder 12 decodes the encoded I2 frame to generate a higher bit-rate decompressed I2 frame, and writes the decompressed I2 frame to the encode stage 4 buffer 112. The video encoder 14 encodes the higher bit-rate decompressed I0 frame to generate a lower bit-rate reconstructed I0' frame and a lower bit-rate compressed I0' frame, writes the reconstructed I0' frame to the reconstructed reference 1 buffer 102, and writes the compressed I0' frame to the output buffer 116.

During time interval T3, the video decoder 12 decodes the encoded I3 frame to generate a higher bit-rate decompressed I3 frame, and writes the decompressed I3 frame to the encode stage 2 buffer 108. The video encoder 14 encodes the higher bit-rate decompressed I3 frame to generate a lower bit-rate reconstructed P3' frame and a lower bit-rate compressed P3' frame, writes the reconstructed P3' frame to the buffer 104, and writes the compressed P3' frame to the output buffer 116. The display controller 18 retrieves the higher bit-rate decompressed I0 frame from the buffer 106 and causes the I0 frame to be shown on the display 28.

During time interval T4, the video decoder 12 decodes the encoded I4 frame to generate a higher bit-rate decompressed I4 frame, and writes the decompressed I4 frame to the encode stage 5 buffer 114. The video encoder 14 encodes the higher bit-rate decompressed I1 frame to generate a lower bit-rate compressed B1' frame, and writes the compressed B1' frame to the output buffer 116. The display controller 18 retrieves the higher bit-rate decompressed I1 frame from the buffer 110 and causes the I1 frame to be shown on the display 28.

During time interval T5, the video decoder 12 decodes the encoded I5 frame to generate a higher bit-rate decompressed I5 frame, and writes the decompressed I5 frame to the encode stage 3 buffer 110. The video encoder 14 encodes the decompressed I2 frame to generate a lower bit-rate compressed B2' frame, and writes the compressed B2' frame to the output buffer 116. The display controller 18 retrieves the higher bit-rate decompressed I2 frame from the buffer 112 and causes the I2 frame to be shown on the display 28.

During time interval T6, the video decoder 12 decodes the encoded I6 frame to generate a higher bit-rate decompressed I6 frame, and writes the decompressed I6 frame to the encode stage 1 buffer 106. The video encoder 14 encodes the decompressed I6 frame to generate a lower bit-rate reconstructed P6' frame and a lower bit-rate compressed P6' frame, writes the reconstructed P6' frame to the buffer 102, and writes the compressed P6' frame to the output buffer 116. The display controller 18 retrieves the higher bit-rate decompressed I3 frame from the buffer 108 and causes the I3 frame to be shown on the display 28.

During time interval T7, the video decoder 12 decodes the encoded I7 frame to generate a higher bit-rate decompressed I7 frame, and writes the decompressed I7 frame to the encode stage 4 buffer 112. The video encoder 14 encodes the decompressed I4 frame to generate a lower bit-rate compressed B4' frame, and writes the compressed B4' frame to the output buffer 116. The display controller 18 retrieves the higher bit-rate decompressed I4 frame from the buffer 114 and causes the I4 frame to be shown on the display 28.

During time intervals T8, T9, T10, and so forth, the video controller 10 operates in a manner similar to those described above.

In example 5, the operations of the video decoder 12, the video encoder 14, and the display controller 18 are designed such that a first frame is overwritten by a second frame only after the first frame will not be used by the video decoder 12, the video encoder 14, or the display controller 18. The video decoder 12, the video encoder 14, and the display controller 18 share the memory 22 such that the memory 22 at any given time stores no more than seven decompressed frames, including five decompressed frames (in buffers 106, 108, 110, 112, and 114) written by the video decoder 12 and two reconstructed frames (in buffers 102 and 104) written by the video encoder 14.

Example 6

In example 6, the lower bit-rate compressed video 30 has a lower resolution as compared to the higher bit-rate compressed video 26. For example, the input encoded video 26 can have 1920×1080 resolution, and the output encoded video 30 can have 1366×768 resolution. The encoded video 26 has frames that are arranged in a display order, whereas the encoded video 26 has frames that are arranged in an encode order. The display controller 18 sends higher resolution frames arranged in the display order to the display 28. Thus, the video controller 10 outputs a lower bit-rate compressed video 30 having lower resolution at the same time that the display 28 shows the video in higher resolution.

The allocation of memory buffers in the memory device 22 for example 6 is similar to that of example 5, as shown in FIG. 4B. The input buffer 100 stores a higher resolution compressed frame, and the output buffer 116 stores a lower resolution compressed frame generated by the video encoder 14. The encode stage 1 buffer 106, encode stage 2 buffer 108, encode stage 3 buffer 110, encode stage 4 buffer 112, and encode stage 5 buffer 114 store higher resolution decompressed frames that are output from the video decoder 12. The reconstructed encode reference 1 buffer 102 and the reconstructed encode reference 2 buffer 104 store lower resolution reconstructed frames that are generated by the video encoder 14, and used by the video encoder 14 during encoding of other frames. A descaler may generate the lower resolution reconstructed frames by using a descaling process. The encoding and the descaling of the frames may be performed at the same time.

Timing sequences for example 6 is similar to that of example 5, as shown in FIG. 4B. The processes performed by the video decoder 12, the video encoder 14, and the display controller 18 are similar to those described in example 5, except that the frames I0', B1', B2', P3', B4', B5', P6', B7', B8', P9', B10', B11', and P12' are lower resolution reconstructed frames, and I0, B1, B2, P3, B4, B5, P6, B7, B8, P9, B10, B11, and P12 are higher resolution decompressed frames.

Similar to example 5, in example 6, the video decoder 12, the video encoder 14, and the display controller 18 share the memory 22 such that the memory 22 at any given time stores no more than seven decompressed frames, including five decompressed frames (in buffers 106, 108, 110, 112, and 114) written by the video decoder 12 and two reconstructed frames (in buffers 102 and 104) written by the video encoder 14.

Example 7

Figures 5A, 5B:
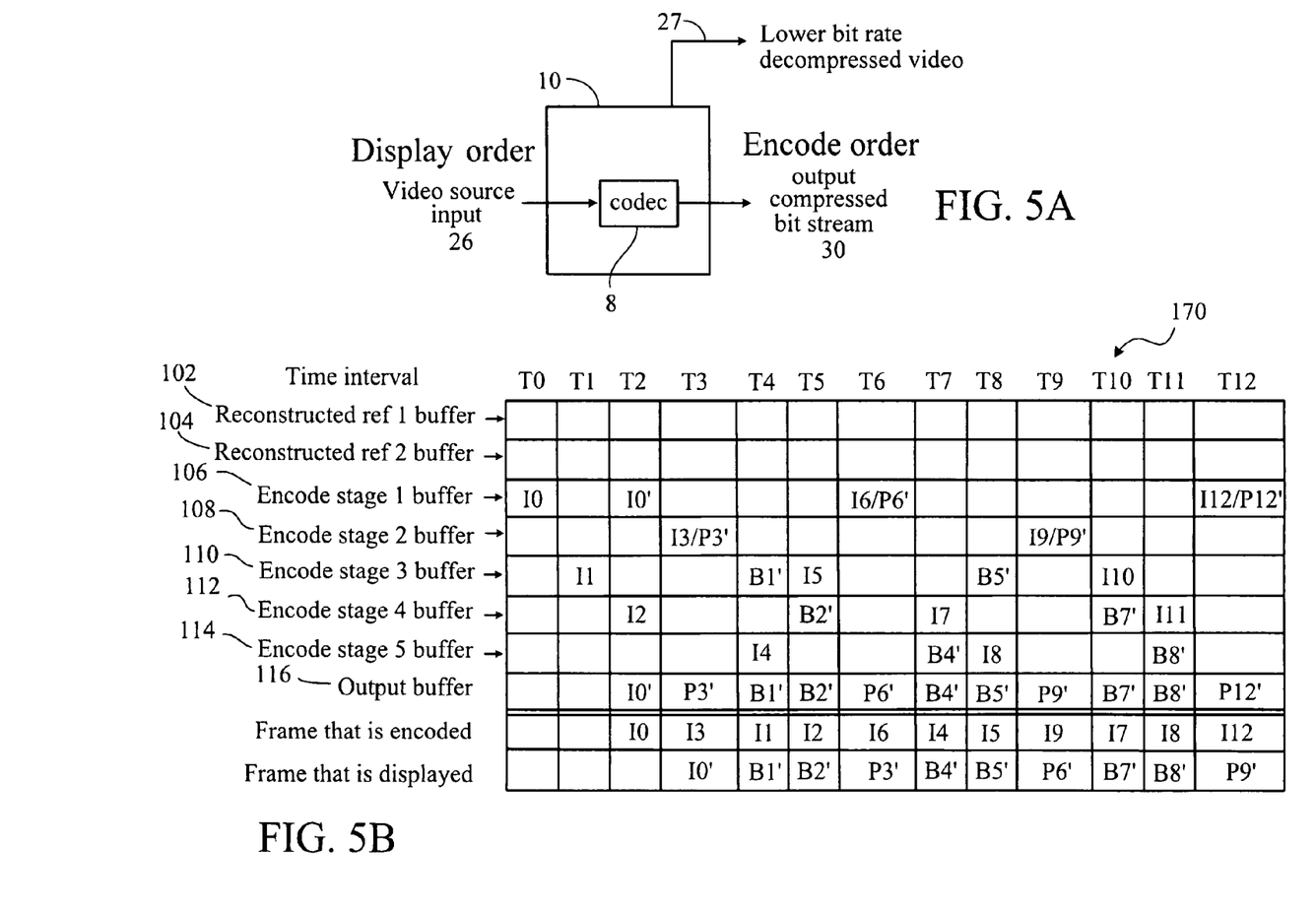

Referring to FIG. 5A, in example 7, similar to example 5, the input encoded video 26 is a compressed higher bit-rate video from a video source in which the frames are all intra frames and arranged in the display order. The output encoded video 30 is a compressed lower bit-rate video in which the frames are arranged in the encode order. The frames of the output video 30 may be encoded according to, e.g., an MPEG standard. The videos 26 and 30 have the same resolution. The difference between examples 5 and 7 is that, in example 7, the display controller 18 sends a lower bit-rate decompressed video 27 to the display 28 in the display order.

FIG. 5B shows a time chart 170 indicating timing sequences in which the frames are stored in the buffers of the memory device 22 and shown on the display 28. In example 7, the reconstructed reference 1 buffer and 102 and the reconstructed reference 2 buffer 104 are not used (as compared to examples 1-6 in which the buffers 102 and 104 were not used). This is because the input video are all intra frames, so when encoding a frame I0, a reconstructed frame I0' can overwrite the frame I0 because I0 is not used in the decoding of subsequent frames. Thus, the encode stage 1 buffer 106 can be used to store the decoded frame I0 and the reconstructed frame I0'. Each frame that is stored in the memory device 22 is stored once without duplication.

The following describes the processes performed by the video decoder 12, video encoder 14, and the display controller 18 at various time intervals.

Before time interval T0 (not shown in FIG. 5B), a higher bit-rate encoded I0 frame is written to the input buffer 100. Similarly, during time intervals T0, T1, T2, T3, T4, T5, T6, T7, T8, T9, T10, T11, T12, . . . , higher bit-rate encoded frames I1, I2, I3, I4, I5, I6, I7, I8, I9, I10, I11, . . . , respectively, are written to the input buffer 100.

During time interval T0, the video decoder 12 decodes the encoded I0 frame to generate a higher bit-rate decompressed I0 frame, and writes the decompressed I0 frame to the encode stage 1 buffer 106.

During time interval T1, the video decoder 12 decodes the encoded I1 frame and generates a higher bit-rate decompressed I1 frame, and writes the decompressed I1 frame to the encode stage 3 buffer 110.

During time interval T2, the video decoder 12 decodes the encoded I2 frame to generate a higher bit-rate decompressed I2 frame, and writes the decompressed I2 frame to the encode stage 4 buffer 112. The video encoder 14 encodes the higher bit-rate decompressed I0 frame to generate a lower bit-rate reconstructed I0' frame and a lower bit-rate compressed I0' frame, writes the reconstructed I0' frame to the encode stage 1 buffer 106 (thereby overwriting the decompressed I0 frame), and writes the compressed I0' frame to the output buffer 116.

During time interval T3, the video decoder 12 decodes the encoded I3 frame to generate a higher bit-rate decompressed I3 frame, and writes the decompressed I3 frame to the encode stage 2 buffer 108. In some examples, the video encoder 14 starts to encode the data in the buffer 108 after the video decoder 12 decodes a certain amount of data, so that during period T3, the buffer 108 is accessed by both the video decoder 12 and the video encoder 14. The video encoder 14 encodes the higher bit-rate decompressed I3 frame to generate a lower bit-rate reconstructed P3' frame and a lower bit-rate compressed P3' frame, writes the reconstructed P3' frame to the buffer 108 (thereby overwriting the decompressed I3 frame), and writes the compressed P3' frame to the output buffer 116. The display controller 18 retrieves the lower bit-rate reconstructed I0' frame from the buffer 106 and causes the I0' frame to be shown on the display 28.

During time interval T4, the video decoder 12 decodes the encoded I4 frame to generate a higher bit-rate decompressed I4 frame, and writes the decompressed I4 frame to the encode stage 5 buffer 114. The video encoder 14 encodes the higher bit-rate decompressed B1 frame to generate a lower bit-rate reconstructed B1' frame and a lower bit-rate compressed B1' frame, writes the reconstructed B1' frame to the buffer 110, and writes the compressed B1' frame to the output buffer 116. The display controller 18 retrieves the lower bit-rate reconstructed B1' frame from the buffer 110 and causes the B1' frame to be shown on the display 28.

During time interval T5, the video decoder 12 decodes the encoded I5 frame to generate a higher bit-rate decompressed I5 frame, and writes the decompressed I5 frame to the encode stage 3 buffer 110. The reconstructed B1' frame can be overwritten because it has already been displayed during T4, and will not be used in the future. The video encoder 14 encodes the decompressed B2 frame to generate a lower bit-rate reconstructed B2' frame and a lower bit-rate compressed B2' frame, writes the reconstructed B2' frame to the buffer 112, and writes the compressed B2' frame to the output buffer 116. The display controller 18 retrieves the lower bit-rate reconstructed B2' frame from the buffer 112 and causes the B2' frame to be shown on the display 28.

During time interval T6, the video decoder 12 decodes the encoded I6 frame to generate a higher bit-rate decompressed I6 frame, and writes the decompressed I6 frame to the encode stage 1 buffer 106. The video encoder 14 encodes the decompressed I6 frame to generate a lower bit-rate reconstructed P6' frame and a lower bit-rate compressed P6' frame, writes the reconstructed P6' frame to the buffer 106 (overwriting the decompressed I6 frame), and writes the compressed P6' frame to the output buffer 116. The display controller 18 retrieves the lower bit-rate decompressed P3' frame from the buffer 108 and causes the P3' frame to be shown on the display 28.

During time interval T7, the video decoder 12 decodes the encoded I7 frame to generate a higher bit-rate decompressed I7 frame, and writes the decompressed I7 frame to the encode stage 4 buffer 112. The video encoder 14 encodes the decompressed I4 frame to generate a lower bit-rate reconstructed B4' frame and a lower bit-rate compressed B4' frame, writes the reconstructed B4' frame to the buffer 114, and writes the compressed B4' frame to the output buffer 116. The display controller 18 retrieves the lower bit-rate decompressed B4' frame from the buffer 114 and causes the B4' frame to be shown on the display 28.

During time intervals T8, T9, T10, and so forth, the video controller 10 operates in a manner similar to those described above.

In example 7, the operations of the video decoder 12, video encoder 14, and display controller 18 are designed such that a first frame is overwritten by a second frame only after the first frame will not be used by the video decoder 12, the video encoder 14, or the display controller 18. The video decoder 12, the video encoder 14, and the display controller 18 share the memory 22 such that the memory 22 at any given time stores no more than five decompressed frames in buffers 106, 108, 110, 112, and 114.

Example 8

In example 8, the lower bit-rate compressed video 30 has a lower resolution as compared to the higher bit-rate compressed video 26. For example, the input encoded video 26 can have 1920×1080 resolution, and the output encoded video 30 can have 1366×768 resolution. The encoded video 26 has frames that are arranged in a display order, whereas the encoded video 26 has frames that are arranged in an encode order. The display controller 18 sends lower resolution frames arranged in the display order to the display 28. Thus, the video controller 10 outputs a lower bit-rate compressed video 30 having lower resolution at the same time that the display 28 shows the video in a lower resolution.

The allocation of memory buffers in the memory device 22 for example 8 is similar to that of example 7, as shown in FIG. 5B. The input buffer 100 stores a higher resolution compressed frame, and the output buffer 116 stores a lower resolution compressed frame generated by the video encoder 14. The encode stage 1 buffer 106, encode stage 2 buffer 108, encode stage 3 buffer 110, encode stage 4 buffer 112, and encode stage 5 buffer 114 may store higher resolution decompressed frames and lower resolution reconstructed frames. A descaler may generate the lower resolution reconstructed frames by using a descaling process. The encoding and the descaling of the frames may be performed at the same time.

Timing sequences for example 8 is similar to that of example 7, as shown in FIG. 5B. The processes performed by the video decoder 12, the video encoder 14, and the display controller 18 are similar to those described in example 7, except that the frames I0', B1', B2', P3', B4', B5', P6', B7', B8', P9', B10', B11', and P12' are lower resolution reconstructed frames, and I0, I1, I2, I3, I4, I5, I6, I7, I8, I9, I10, I11, and I12 are higher resolution decompressed frames.

Similar to example 7, in example 8, the video decoder 12, the video encoder 14, and the display controller 18 share the memory 22 such that the memory 22 at any given time stores no more than five decompressed frames in buffers 106, 108, 110, 112, and 114.

In examples 1-8 described above, the system controller 24 coordinates the operations of the video decoder 12, the video encoder 14, and the display controller 8 according to the formats of the input and output signals. The video controller 10 may include firmware that includes code for controlling the operations of various components. The firmware may include code to cause the display 28 to show menu options to allow a user to specify, for example, the input and output formats, whether to display higher or lower resolution video, and the resolution and the bit rate of the output encoded video 30.

Alternative Examples

In the description above, the videos are encoded/decoded according to a JPEG, DV, or MPEG standard. The videos can also be encoded/decoded using other standards, such as International Telecommunications Union (ITU) H.261, H.263, or H.264 standard. The video controller 10 can be used to transcode a lower bit-rate video to a higher bit-rate video. The video controller 10 can be used to transcode a lower resolution video to a higher resolution video. If the video is not shown on a display, each of the time intervals T0, T1, T2, . . . , does not necessarily have to be equal to a frame period. The duration of the time intervals depend on the speed on decoding and encoding.

The video controller 10 can be incorporated in, for example, a video recorder (which can store video programs to tapes, optical media, hard drives, or other non-volatile storage), a television or set-top box having a built-in mass storage, a portable video player/recorder, and a cell phone capable of playing/recording video.

In examples 1-4, the memory device 22 can be made smaller by omitting the buffer 114, which is not used. In examples 7 and 8, the memory device 22 can be made smaller by omitting the buffers 102 and 104, which are not used. The display controller 18 may be omitted from the video controller 10 if the video is not shown on a display.

Other examples are within the scope of the following claims.

What is claimed is:

1. An apparatus comprising:
    a video decoder to generate decompressed frames from first compressed video frames, at least one of the decompressed frames being generated using information from a previously generated decompressed frame and being stored in a memory; and
    a video encoder to generate second compressed video frames from the stored decompressed frames without duplicating the decompressed frames stored in the memory.

2. The apparatus of claim 1, further comprising a display controller to control display of the decompressed frames without duplicating the decompressed frames.

3. The apparatus of claim 2, further comprising a system controller to control the video decoder, the video encoder, and the display controller to generate and display the second compressed video frames before the decompressed frames stored in the memory are overwritten by subsequent decompressed frames.

4. The apparatus of claim 1 in which the video encoder generates reconstructed frames that correspond to frames decompressed from the second compressed video, the video encoder storing the reconstructed frames in the memory.

5. The apparatus of claim 4, further comprising a display controller to cause display of the reconstructed frames without duplicating the reconstructed frames.

6. The apparatus of claim 1, further comprising a system controller to control the video decoder and the video encoder to generate the second compressed video frames before the decompressed frames stored in the memory are overwritten by subsequent decompressed frames.

7. The apparatus of claim 1 in which the decompressed frames comprise intra-frames (I-frames), forward predicted frames (P-frames), and bi-directional predicted frames (B-frames).

8. The apparatus of claim 7 in which when the decompressed frames are arranged in a display sequence, the decompressed frames comprise at least two consecutive B-frames.

9. The apparatus of claim 8 in which the video decoder and video encoder share the memory such that the memory at any given time stores no more than four decompressed frames written by the video decoder and two reconstructed frames written by the video encoder.

10. The apparatus of claim 8 in which the video decoder and the video encoder share the memory such that the memory at any given time stores no more than six decompressed frames.

11. The apparatus of claim 8 in which the video decoder and the video encoder share the memory such that the memory at any given time stores at most seven decompressed frames.

12. The apparatus of claim 1 in which the first compressed video and the second compressed video have different bit rates.

13. The apparatus of claim 1 in which the first compressed video and the second compressed video have different resolutions.

14. The apparatus of claim 1, further comprising a descaler to generate lower resolution frames from higher resolution frames.

15. The apparatus of claim 1 in which the first compressed video comprises a serial bit stream.

16. A video processing system comprising:
    a video decoder to generate decompressed frames that include intra-frames (I-frames), forward predicted frames (P-frames), and bi-directional predicted frames (B-frames) from first compressed video, at least some of the decompressed frames being generated using information from previously decompressed frames and being stored in a memory; and
    a video encoder to generate second compressed video frames from the stored decompressed frames without duplicating the decompressed frames stored in the memory, the second compressed video frames having a different bit rate and/or different resolution as compared to the first compressed video frames.

17. The video processing system of claim 16, further comprising a display controller to output a representation of the first compressed video frames to a display device without duplicating the frames stored in the memory.

18. The video processing system of claim 16, further comprising a system controller to control the video decoder and the video encoder.

19. An apparatus comprising:
    a video decoding means for generating decoded frames from first encoded video frames using information from previously decoded frames and storing the decoded frames in a memory; and
    a video encoding means for generating second encoded video frames from the decoded frames without duplicating the decoded frames stored in the memory.

20. The apparatus of claim 19, further comprising a display means for displaying a representation of the decoded frames without duplicating frames stored in the memory.

21. The apparatus of claim 19 in which the decoded frames comprise intra-frames (I-frames), forward predicted frames (P-frames), and bi-directional predicted frames (B-frames).

22. An apparatus comprising:
    a video decoder to generate decompressed frames from first compressed video frames and store the decoded frames in a memory, the first compressed video comprises a sequence of compressed frames that are arranged according to a display sequence; and a video encoder to generate second compressed video frames from the decompressed frames without duplicating the decompressed frames stored in a memory.

23. The apparatus of claim 22, further comprising a display controller to cause display of a representation of the decompressed frames without duplicating the decompressed frames.

24. The apparatus of claim 22 in which the decompressed frames comprise intra-frames (I-frames), forward predicted frames (P-frames), and bi-directional predicted frames (B-frames).

25. A method comprising:
generating decompressed frames of a first compressed video using information from previously decompressed frames;
storing the decompressed frames in a memory; and
generating a second compressed video using the stored decompressed frames stored in the memory without duplicating the decompressed frames stored in the memory.

26. The method of claim 25, further comprising controlling the generating of the decompressed frames and the generating of the second compressed video so that the decompressed frames are compressed before being overwritten by subsequent decompressed frames.

27. The method of claim 25, further comprising displaying the decompressed frames without duplicating the decompressed frames.

28. The method of claim 27, further comprising controlling the generating of the decompressed frames, the generating of the second compressed video, and the displaying so that the decompressed frames are compressed and displayed before being overwritten by subsequent decompressed frames.

29. The method of claim 25 in which generating the decompressed frames comprises generating intra-frames (I-frames), forward predicted frames (P-frames), and bi-directional predicted frames (B-frames).

30. The method of claim 29 in which when the decompressed frames are arranged in a display sequence, the sequence comprises two consecutive B-frames.

31. The method of claim 30 in which the writing and the encoding comprises storing at most 6 decompressed frames in the memory.

32. The method of claim 30 in which the writing and the encoding comprises storing at most 7 decompressed frames in the memory.

33. A method comprising:
generating decompressed frames from a first compressed video comprising a sequence of compressed frames that are arranged according to a display sequence; and
storing the decompressed frames in a memory; and
generating a second compressed video from the stored decompressed frames without duplicating the decompressed frames stored in the memory.

34. A method comprising:
decoding a first compressed video to generate decompressed frames;
writing the decompressed frames to a memory;
encoding the decompressed frames to generate a second compressed video without duplicating the decompressed frames written to the memory, including generating reconstructed frames for use as references for encoding some of the decompressed frames; and
writing the reconstructed frames in the memory, at least some of the reconstructed frames overwriting some of the decompressed frames.

35. The method of claim 34 in which the second compressed video has a data rate that is different from the data rate of the first compressed video.

36. The method of claim 34 in which the second compressed video has a resolution that is different from the resolution of the first compressed video.

37. The method of claim 34 further comprising displaying the reconstructed frames without duplicating the reconstructed frames.

38. The method of claim 34 in which the decoding comprises decoding according to an MPEG standard.

* * * * *